(12) United States Patent
Kwok et al.

(10) Patent No.: US 12,709,001 B2
(45) Date of Patent: Aug. 18, 2026

(54) LEARNING-BASED TENSEGRITY ROBOT JOINT

(71) Applicant: The University of Hong Kong, Hong Kong (HK)

(72) Inventors: Ka-Wai Kwok, Hong Kong (HK); Yifeng Hao, Hong Kong (HK)

(73) Assignee: The University of Hong Kong, Hong Kong (HK)

( * ) Notice: Subject to any disclaimer, the term of this patent is extended or adjusted under 35 U.S.C. 154(b) by 130 days.

(21) Appl. No.: 18/764,343

(22) Filed: Jul. 4, 2024

(65) Prior Publication Data

US 2025/0018558 A1 Jan. 16, 2025

Related U.S. Application Data

(60) Provisional application No. 63/512,911, filed on Jul. 11, 2023.

(51) Int. Cl.
*B25J 9/10* (2006.01)
*B25J 9/16* (2006.01)

(52) U.S. Cl.
CPC ............ *B25J 9/1075* (2013.01); *B25J 9/163* (2013.01)

(58) Field of Classification Search
CPC . B25J 9/163; B25J 9/104; B25J 9/1045; B25J 9/1075; B25J 9/065
See application file for complete search history.

(56) References Cited

U.S. PATENT DOCUMENTS 11,400,585 B2 * 8/2022 Manfredi ................ B25J 9/065

OTHER PUBLICATIONS

"Soft Tensegrity Robots" video by Jean-Baptiste Mouret, uploaded on Jun. 28, 2018 and publicly available at https://www.youtube.com/watch?v=SuLQDhrk9tQ (Year: 2018).*

Vishal Ramadoss et al., "Hedra: A Bio-Inspired Modular Tensegrity Robot With Polyhedral Parallel Modules", 2022 IEEE 5th International Conference on Soft Robotics (RoboSoft), 2022, p. 1-7.

Jie Zhang et al., "Versatile Like a Seahorse Tail: A Bio-Inspired Programmable Continuum Robot for Conformal Grasping", Advanced Intelligent Systems, 2022, vol. 4, No. 2200263, p. 1-9.

(Continued)

*Primary Examiner* — Randell J Krug
(74) *Attorney, Agent, or Firm* — IDEA Intellectual Limited; Sam T. Yip

(57) ABSTRACT

A tensegrity joint comprising: a first inner structure having a first frame and a first strut extending orthogonally from the first frame; a second inner structure having a second frame and a second strut extending orthogonally from the second frame; at least three actuation tendons, each being fixed at a respective hole at the first frame and being guided and allowed to slide through a respective hole at the second frame; a central tendon connecting an apex of the first strut and an apex of the second strut such that the central tendon is in balance with the pulling forces exerted by the at least three actuation tendons; and an outer elastic protection sheath configured to wrap around a cylindrical surface between the first and second inner structures.

20 Claims, 15 Drawing Sheets

(56) References Cited

OTHER PUBLICATIONS

Bitao Yao et al., "Sensorless and adaptive admittance control of industrial robot in physical human—robot interaction", Robotics and Computer—Integrated Manufacturing, 2018, vol. 51, p. 158-168.
Weitian Wang et al., "Facilitating Human-Robot Collaborative Tasks by Teaching-Learning-Collaboration From Human Demonstrations", IEEE Transactions on Automation Science and Engineering, 2019, vol. 16, p. 640-653.
Jason Chan et al., "Active Robotic Total Knee Arthroplasty (TKA): Initial Experience with the TSolution One® TKA System", Surgical Technology International, 2020, vol. 37, p. 1-7.
Cécile Batailler et al., "Concepts and techniques of a new robotically assisted technique for total knee arthroplasty: the Rosa knee system", Archives of Orthopaedic and Trauma Surgery, 2021, vol. 141, No. 12, p. 2049-2058.
Huu Minh Le et al., "A Survey on Actuators-Driven Surgical Robots", Sensors and Actuators A: Physical, 2016, vol. 247, p. 323-354.
Anand Kumar Mishra et al., "Simba: Tendon-Driven Modular Continuum Arm with Soft Reconfigurable Gripper", Frontiers in Robotics and AI, 2017, vol. 4, No. 4, p. 1-10.
Taehoon Lee et al., "Design of a 2DoF Ankle Exoskeleton with a Polycentric Structure and a Bi-Directional Tendon-Driven Actuator Controlled Using a PID Neural Network", Actuators, 2021, vol. 10, No. 9, p. 1-17.
Takahisa Kato et al., "Tendon-Driven Continuum Robot for Endoscopic Surgery: Preclinical Development and Validation of a Tension Propagation Model", IEEE/ASME Transactions on Mechatronics, 2015, vol. 20, p. 2252-2263.
D. B. Camarillo et al., "Mechanics Modeling of Tendon-Driven Continuum Manipulators", IEEE Transactions on Robotics, 2008, vol. 24, No. 6, p. 1262-1273.
Yan Wang et al., "Design and Experimental Validation of a Miniaturized Robotic Tendon-Driven Articulated Surgical Drill for Enhancing Distal Dexterity in Minimally Invasive Spine Fusion", IEEE/ASME Transactions on Mechatronics, 2021, vol. 26, p. 1858-1866.
Massimo Vespignani et al., "Design of SUPERball v2, a Compliant Tensegrity Robot for Absorbing Large Impacts", 2018 IEEE/RSJ International Conference on Intelligent Robots and Systems (IROS), 2018, p. 2865-2871.
Yixiang Liu et al., "A Tensegrity-Based Inchworm-Like Robot for Crawling in Pipes With Varying Diameters", IEEE Robotics and Automation Letters, 2022, vol. 7, No. 4, p. 11553-11560.
Bingxing Chen et al., "Swimming Performance of a Tensegrity Robotic Fish", Soft Robotics, 2019, vol. 6, No. 4, p. 520-531.
Yixiang Liu et al., "Development of a Bio-inspired Soft Robotic Gripper based on Tensegrity Structures", 2021 IEEE/RSJ International Conference on Intelligent Robots and Systems (IROS), 2021, p. 7398-7403.
Wen-Yung Li et al., "New Soft Robot Hand Configuration with Combined Biotensegrity and Thin Artificial Muscle", IEEE Robotics and Automation Letters, 2020, vol. 5, p. 4345-4351.
Andrew P. Sabelhaus et al., "Inverse Statics Optimization for Compound Tensegrity Robots", IEEE Robotics and Automation Letters, 2020, vol. 5, p. 3982-3989.
Shuo Ma et al., "Tensegrity system dynamics based on finite element method", Composite Structures, 2022, vol. 280, No. 114838, p. 1-13.
Kun Wang et al., "Real2Sim2Real Transfer for Control of Cable-driven Robots via a Differentiable Physics Engine", 2023 IEEE/RSJ International Conference on Intelligent Robots and Systems (IROS), 2023, p. 1-10.
Shuo Ma et al., "The Equilibrium and Form-Finding of General Tensegrity Systems with Rigid Bodies", Engineering Structures, 2022, vol. 266, No. 114618, p. 1-30.
William R. Johnson III et al., "Sensor Tendons for Soft Robot Shape Estimation", 2022 IEEE Sensors, 2022, p. 1-4.
Wen-Yung Li et al., "Shape Recognition of a Tensegrity With Soft Sensor Threads and Artificial Muscles Using a Recurrent Neural Network", IEEE Robotics and Automation Letters, 2021, vol. 6, No. 4, p. 6228-6234.
Ryota Kobayashi et al., "Soft Tensegrity Robot Driven by Thin Artificial Muscles for the Exploration of Unknown Spatial Configurations", IEEE Robotics and Automation Letters, 2022, vol. 7, p. 5349-5356.
Joran W. Booth et al., "Surface Actuation and Sensing of a Tensegrity Structure Using Robotic Skins", Soft Robotics, 2021, vol. 8, p. 531-541.
Hing-Choi Fu et al., "Interfacing Soft and Hard: A Spring Reinforced Actuator", Soft Robotics, 2020, vol. 7, p. 44-58.
Justin D. L. Ho et al., "Localized online learning-based control of a soft redundant manipulator under variable loading", Advanced Robotics, 2018, vol. 32, p. 1168-1183.
Steven Lessard et al., "A Bio-Inspired Tensegrity Manipulator with Multi-DOF, Structurally Compliant Joints", 2016 IEEE/RSJ International Conference on Intelligent Robots and Systems (IROS), 2016, p. 5515-5520.
Davide Zappetti et al., "Dual Stiffness Tensegrity Platform for Resilient Robotics", Advanced Intelligent Systems, 2022, vol. 4, No. 2200025, p. 1-9.
Jie Zhang et al., "Novel Design of a Cable-Driven Continuum Robot With Multiple Motion Patterns", IEEE Robotics and Automation Letters, 2022, vol. 7, No. 3, p. 6163-6170.
Davide Zappetti et al., "Variable-Stiffness Tensegrity Spine", Smart Materials and Structures, 2020, vol. 29, No. 075013, p. 1-8.
Wei Liang et al., "A bioinspired robotic knee with controlled joint surfaces and adjustable ligaments", Bioinspiration & Biomimetics, 2022, vol. 17, No. 066006, p. 1-18.
Shuhei Ikemoto et al., "Development of a Modular Tensegrity Robot Arm Capable of Continuous Bending", Frontiers in Robotics and AI, 2021, vol. 8, No. 774253, No. 1-12.
Yuhei Yoshimitsu et al., "Development of Pneumatically Driven Tensegrity Manipulator without Mechanical Springs", 2022 IEEE/RSJ International Conference on Intelligent Robots and Systems (IROS), 2022, p. 1-6.
Seok Chang Ryu et al., "FBG-based Shape Sensing Tubes for Continuum Robots", 2014 IEEE International Conference on Robotics and Automation (ICRA), 2014, p. 3531-3537.
Kui Wang et al., "A Fast Soft Robotic Laser Sweeping System Using Data-Driven Modeling Approach", IEEE Transactions on Robotics, 2023, vol. 39, No. 4, p. 3043-3058.
Kui Wang et al., "Large-Scale Surface Shape Sensing with Learning-Based Computational Mechanics", Advanced Intelligent Systems, 2021, vol. 3, No. 2100089, p. 1-11.
Xiaomei Wang et al., "Eye-in-Hand Visual Servoing Enhanced With Sparse Strain Measurement for Soft Continuum Robots", IEEE Robotics and Automation Letters, 2020, vol. 5, No. 2, p. 2161-2168.
Xiaomei Wang et al., "Learning-Based Visual-Strain Fusion for Eye-in-Hand Continuum Robot Pose Estimation and Control", IEEE Transactions on Robotics, 2023, vol. 39, p. 2448-2467.
Ka-Wai Kwok et al., "Dimensionality Reduction in Controlling Articulated Snake Robot for Endoscopy Under Dynamic Active Constraints", IEEE Transactions on Robotics, 2013, vol. 29, p. 15-31.
Yingqi Li et al., "Towards Adaptive Continuous Control of Soft Robotic Manipulator using Reinforcement Learning", 2022 IEEE/RSJ International Conference on Intelligent Robots and Systems (IROS), 2022, p. 7074-7081.
J.Y. Zhang et al., "Adaptive force density method for form-finding problem of tensegrity structures", International Journal of Solids and Structures, 2006, vol. 43, p. 5658-5673.
Nizar Bel Hadj Ali et al., "Analysis of clustered tensegrity structures using a modified dynamic relaxation algorithm", International Journal of Solids and Structures, 2011, vol. 48, p. 637-647.

* cited by examiner

LEARNING-BASED TENSEGRITY ROBOT JOINT

CROSS-REFERENCE TO RELATED APPLICATIONS

The present application claims priority from the U.S. Provisional Patent Application No. 63/512,911 filed 11 Jul. 2023, and the disclosure of which is incorporated herein by reference in its entirety.

FIELD OF THE INVENTION

The present invention relates to a tensegrity joint, and more specifically relates to learning-based tensegrity robot joint for use in collaborative robotic systems.

BACKGROUND OF THE INVENTION

Collaborative robots have been widely applied across a variety of fields, such as industrial manufacturing and robotic-assisted surgeries for the purpose of reducing repeatable work while assisting human with physical effort and facilitating precise motion. However, current collaborative robotic systems usually implement bulky robot arms with poor haptic and ergonomic properties due to the conventional rigid links and rotary joints that consist of a motor, brake, harmonic drive or other gearbox. This leads to inherent actuation friction and high inertia, which can impart resistive forces during interactions and risks from instantaneous collisions even when the robot is under back-drivable control. Compact, low-inertia, and even soft compliant robotic joint mechanisms are in great demand for ensuring safe interactions, and also avoiding cumbersome setups due to the separation between human and robot.

Tendon-driven robots, which enable remote transmission to reduce robot link size and weight while maintaining sufficient distal dexterity and force, have drawn increasing interest. Many emerging applications include serial-link manipulators, exoskeletons, and surgical instruments such as endoscopes, cardiac catheters, and robotic drills. The structural stiffness can be increased with preloading of the tendons. However, in particular for serial-link or soft continuum robots, such preloading would induce substantial axial compression on the backbone links and contact joints, giving rise to increased overall bending stiffness and friction, thereby requiring larger pulling forces to drive the robot motion in return.

In contrast, tensional integrity, namely tensegrity, which consists of rigid bodies (struts) and tendons, is constrained by the tensions in the system, while there is no direct contact between the rigid components. Thus, no sliding or static friction is involved among rigid bodies. External forces will be passively distributed through a network of tension, but not breaking the static equilibrium. Structural stiffness of this tensegrity would be solely determined by the tensions. However, this mechanism would also allow significantly less tolerance to any errors of actuation, as a result of requiring complex kinematics modeling and the sophisticated actuation sensing. Therefore, tensegrity structures were mostly found in various locomotion robots capable of rolling, pipe crawling, and swimming, and soft continuum or serial-link robot architectures aiming entire body shape control like compliant grasping, accredited to the high power density and flexibility of tensegrity, but were rarely implemented on the robots targeting dexterous end-effector manipulation.

To take full use of tensegrity's promising characteristics, modeling and control of such an over-constrained mechanism must be advanced. It is worth noting that both kinematics and static equilibrium constraints have to be well satisfied. This is known as the form-finding problem, for which force density method (FDM) was commonly used to simplify the robot as a cable network comprising nodes, bars, and cables, but which would be oversimplified and limited to specific mass inter structures. Finite element modeling was also used to linearize tensegrity dynamics model, but which would be too computationally intensive. To bypass such intensive computation, Real2Sim2Real strategy was proposed to employ differentiable physics engine for simulating the robot kinematics/dynamics model based on the limited data observed from the real robot. The resultant simulated model can offer sufficient training datasets to form a deep-learning model for real use. In such simulated physics engines, the prestress, material, and geometric information could be taken into account for deducing the nonlinear equilibrium equations.

Therefore, sufficiency of sensing data, regarding the robot configuration feedback, is of importance to the aforementioned data-driven approaches. Encoding the tendons length is a common approach to reflect the robot configuration through its forward kinematics, if existing. In one approach, stretchable tendon sensors are used to detect the morphology of a crawling tensegrity robot with the purpose of environment exploration. Similarly, many strain sensors were used to estimate the shape of a rolling tensegrity robot. To extend the application to serial-link or soft compliant manipulators and grippers, which have to support and experience a great variety of external loads in task space, the overall robot control performance should be improved by the inherent robot stiffness varying in a wide range, rather than just heavily relying on promising sensing feedback of the robot configuration.

Among the studies about tensegrity structures, only a few of them are on serial-link robots. Taking inspiration from human anatomical structures, a tensegrity manipulator with two joints that functioned similarly to human elbow and shoulder was developed, incorporating actuation tendons to lift its lower segments. This represents the early implementation of translating static tensegrity structure into an actuated robotic manipulator.

Stacked mechanisms are commonly used to construct tensegrity manipulators from several similar segments, in which each segment was supported by tendons linked to the apex of its lower segment. Due to the lack of accurate kinematics model and sensing approach, there were spared tendon lengths that did not fully constrain the structure but the tendons were only passively straightened by the gravity load, to avoid structural collapse from actuation errors. These under-constrained mechanisms would be susceptible to small variations of external loads, causing the manipulation behavior to be inconsistent over different times of operation, resulting in great challenges when implementing data-driven control approaches.

To enhance the manipulation repeatability, elastic springs have been adopted to replace the tendons, hence, suppressing the free motions of the manipulator. The bending motions became controllable through the use of trained mapping between the desired bending curvatures and their corresponding tendon configurations. For example, the Mckibben artificial muscles composed of inner pneumatic bladders and exterior braided sleeves, were used as actuation tendons to enhance the impact resistance. However, the compliance induced by springs or artificial muscles would deteriorate control accuracy, particularly when supporting a varying load. A variable-stiffness mechanism was developed to adjust the bending stiffness of a tensegrity spine, which allowed each segment to be rigidly attached to its adjacent segments through a spherical pin when pulling all the tendons, but at the expense of reduced workspace in this stiffer state. Mimicking the anatomical structure and kinematics of the human knee, a bio-inspired robotic knee was developed with adjustable joint stiffness, achieved by tightening/releasing the springs connected to the tendons, while the joint provided only one passive degree of freedom (DoF) and was actuated by an external connecting bar. Another stiffer tensegrity manipulator actuated by pneumatic cylinders was also designed, but its bulky and heavy robot links result in limited operation bandwidth (~1 Hz). Furthermore, the sole use of tendon length encoding in the existing tensegrity manipulators, would make the robot configuration sensing feedback very unreliable. Possible tendon slack usually caused by the modeling/actuation errors would worsen sensing feedback, thus giving incorrect cues about the robot end-effector pose.

SUMMARY OF THE INVENTION

One objective of the present invention is to provide a compact, reliable, low-inertia and reduced-friction soft tensegrity robot joint with two degrees of freedom (DoFs), which would be capable of enabling safe interaction and robustness to disturbance and considered a primitive component for the use in a collaborative robot. Another objective of the present invention is to incorporate the soft tensegrity robot joint with a high-level data-driven machine-learning-based controller with tendon length encoding and skin shape sensing to allow realtime close-loop control of the robot joint with large deformation.

In accordance with a first aspect of the present invention, a tensegrity joint is provided. The tensegrity joint comprises: a first inner structure having a first frame and a first strut extending orthogonally from the first frame; a second inner structure having a second frame and a second strut extending orthogonally from the second frame; at least three actuation tendons, each being fixed at a respective hole at the first frame and being guided and allowed to slide through a respective hole at the second frame; a central tendon connecting an apex of the first strut and an apex of the second strut such that the central tendon is in balance with the pulling forces exerted by the at least three actuation tendons; and an outer elastic protection sheath configured to wrap on a cylindrical surface between the first and second inner structures.

In accordance with a second aspect of the present invention, a learning-based tensegrity robot joint is provided. The learning-based tensegrity robot joint comprises the tensegrity joint in accordance with the first aspect of the present invention; at least three motors for pulling the at least three actuation tendons respectively; and a learning-based controller configured for controlling the at least three motors. The learning-based controller is trained on basis of a training dataset prepared by a sampling technique including: generating, based on a geometric model of the tensegrity joint, an actuation sequence containing initial tendon configurations; and executing all the initial tendon configurations contained in the generated actuation sequence and correcting, during actual joint movement, each of the initial tendon configurations in a torque-control manner by multiple trials of releasing and pulling the tendon individually.

In accordance with a third aspect of the present invention, a method for training a learning-based tensegrity robot joint is provided. The method comprises training a learning-based controller of the learning-based tensegrity robot joint on basis of a training dataset prepared by a sampling technique including: generating, based on a geometric model of the tensegrity joint, an actuation sequence containing initial tendon configurations; and executing all the initial tendon configurations contained in the generated actuation sequence and correcting, during actual joint movement, each of the initial tendon configurations in a torque-control manner by multiple trials of releasing and pulling the tendon individually.

Compared to the conventional manipulator linked by rotary joints each of which just provides 1-DoF rotation, the tensegrity robot joint provided by the present invention has no sliding/static friction involved among the rigids bodies even under high robot load and tendon pretensions. Accredited to the actuation redundancy, the joint stiffness can also be varied against the external/impulsive disturbances. With the high-level data-driven machine-learning-based controller, the tensegrity robot joint could follow prescribed paths along "8"-like and square patterns, respectively, with RMSE of 1.06 mm and 1.04 mm. Without preloading the tendons, the joint could still resist external disturbances, such as a 114-g load that is twice the joint weight, during the path following task.

BRIEF DESCRIPTION OF DRAWINGS

Embodiments of the invention are described in more details hereinafter with reference to the drawings, in which.

DETAILED DESCRIPTION

In the following description, a learning-based tensegrity robot joint and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
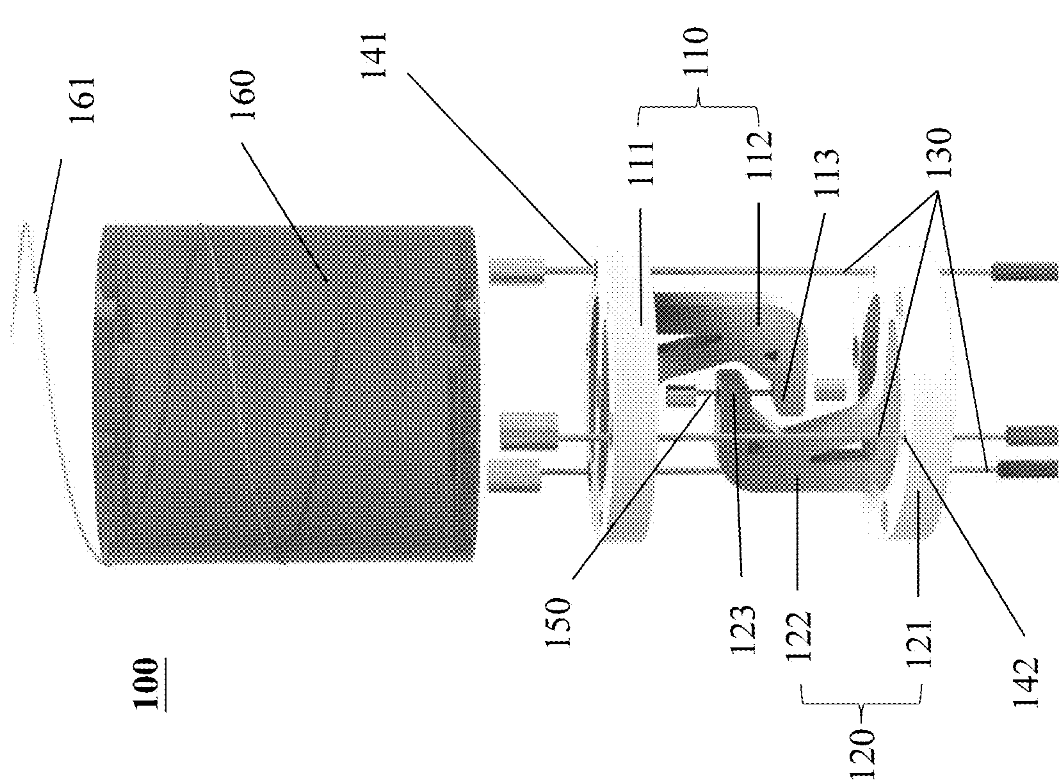
FIG. 1A shows an exploded view of interior structure of the tensegrity joint in accordance with one embodiment of the present invention.

FIG. 1A shows an exploded view of a tensegrity joint in accordance with one embodiment of the present invention. As shown, the tensegrity joint 100 comprises a first inner structure 110 having a first frame 111 and a first strut 112 extending orthogonally from the first frame; a second inner structure 120 having a second frame 121 and a second strut 122 extending orthogonally from the second frame. The first strut and the second strut may be overlaid to each other at a level to allow the tensegrity joint 100 to bend for a bending angle.

The tensegrity joint 100 further comprises at least three actuation tendons 130. In one embodiment, each actuation tendon 130 is fixed at a respective hole 141 at the first frame 111 and being guided and allowed to slide through a respective hole 142 at the second frame 121.

The tensegrity joint 100 further comprises a central tendon 150 connecting an apex 113 of the first strut 112 and an apex 123 of the second strut 122 such that the central tendon 150 is in balance with the pulling forces exerted by the at least three actuation tendons 130.

The actuation tendons and central tendons may be made of reinforced metal wires, such as braided steel wires or nickel wires. The actuation tendons and central tendons may also be made of reinforced polymer-based wires.

Figure 1C:
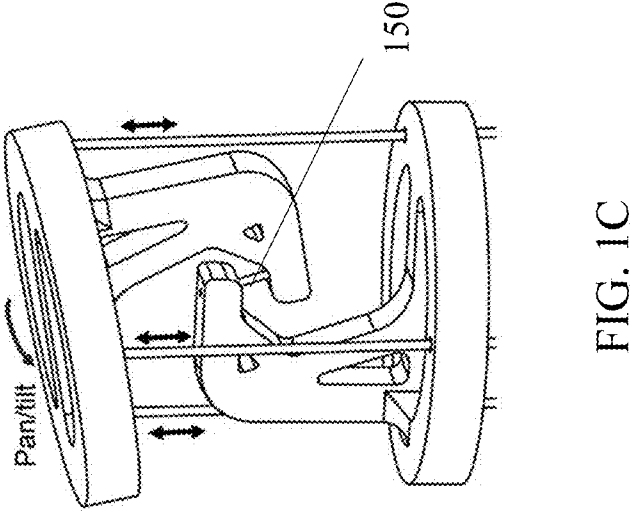
FIG. 1C shows pan/tilt bending of the tensegrity joint by adjusting tendon lengths.
Figure 1B:
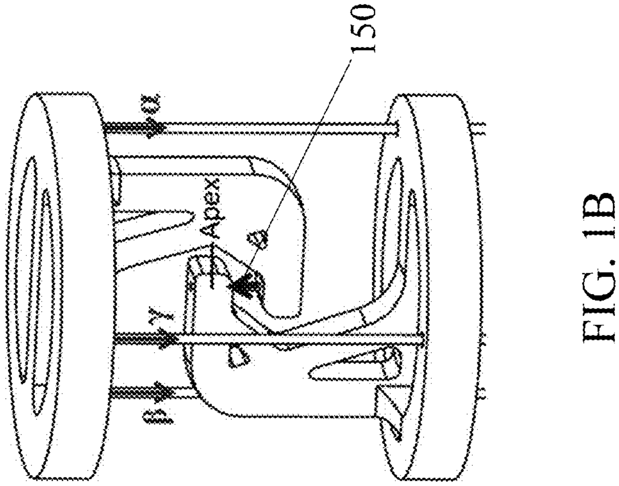
FIG. 1B shows a natural configuration of the tensegrity joint with equal lengths of all three actuation tendon vectors $\alpha$, $\beta$, and $\gamma$.

The tension of the central tendon 150 is configured to compensate the pre-loaded pulling forces on the three actuation tendons (FIG. 1B). By adjusting the differences of pulling forces among these three tendon lengths, the upper frame can be steered in 2 DoFs, pan/tilt, swinging about the apex of the lower frame (FIG. 1C), thereby generating bending motions of the joint. While satisfying both the kinematics and static equilibriums, respectively, coordinating the length differences and tensions of the three tendons, such a joint configuration can be stabilized firmly to support external load. During static equilibrium, tension of the central tendon 150 is always equal to the sum of the other three tendon tensions 130.

The central tendon is configured to afford high tension counteracting the high load manipulation. The tensegrity joint 100 further comprises a first mechanical connector for connecting the central tendon with the first struct and a second mechanical connector connecting the central tendon with the second struct. Each of the first and second mechanical connectors may be made of very rigid and strong materials, such as, but not limited to, metals (such as aluminum, titanium), wood, and any high-strength polymers (like PEEK, ABS) or 3D-printing resins.

The tensegrity joint 100 further comprises an outer elastic protection sheath 160 configured to enclose the first and second inner structures 110 and 120. The outer elastic protection sheath is prestressed to keep pulling the first and second frames (or the first and second inner structures) to each other to provides resistance to torsional force, ensuring the integrity by not just heavily relying on the three actuation tendon tensions. Such configuration not only enhances the bending motion stability, but also helps restore the tensegrity joint to its original equilibrium or natural configuration. The protection sheath may be made of any suitable elastic materials, such as, but not limited to, silicone, polydimethylsiloxane (PDMS), thermoplastic polyurethane (TPU), or fluoroelastomers.

Figure 2:
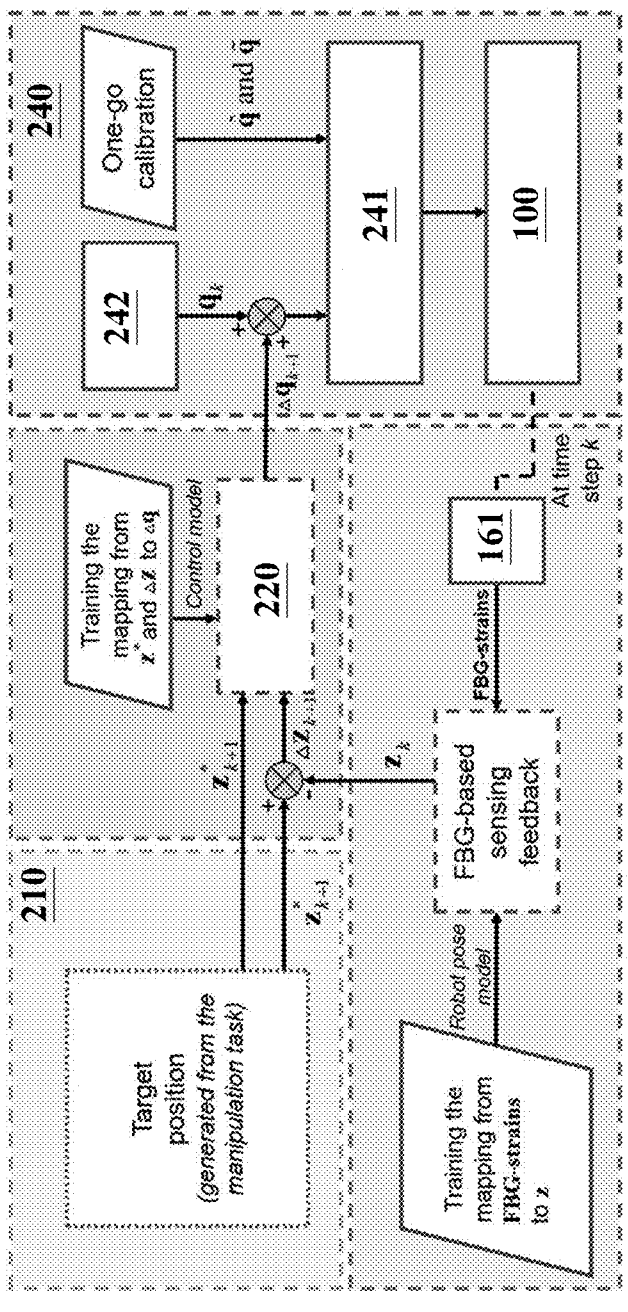
FIG. 2 shows a schematic diagram of a learning-based tensegrity robot joint in accordance with one embodiment of the present invention.

FIG. 2 shows a schematic diagram of a learning-based tensegrity robot joint in accordance with one embodiment of the present invention. As shown, the learning-based tensegrity robot joint includes an input unit 210, a learning-based controller 220, a fiber Bragg grating (FBG)-based shape sensing unit 230 and a robot unit 240 including the tensegrity joint 100.

The robot unit 240 further includes actuation motors 241 coupled with the actuation tendons of the tensegrity joint to apply a pre-loaded pulling force on the actuation tendons respectively; and motor encoders 242 for encoding tendon lengths to have an open-loop control of the actuation.

The FBG-based shape sensing unit 230 comprises the FBG-based sensor 161. Referring back to FIG. 1A, the FBG-based sensor 161 may be wounded helically around and embedded inside the outer elastic protection sheath 160. The FBG-based shape sensing unit 230 is configured for sensing configurations of the tensegrity joint in real time to reflect the sparse strain changes along with the joint bending for closed-loop feedback control of the actuation.

The stretchable protection sheath 160 embedded with the FBG sensor 161 is configured to tightly wrap around the joint to serve as a soft skin sensor which can enhance the structural stability, and also to provide self-contained shape sensing feedback.

Each of the first and second struts may have a "L"-shape such that a large bending angle (e.g., ±25°) of the joint is allowed. Each of the first and second frames may have a circular shape and the stretchable protection sheath 160 may enclose the first and second frames to have a cylindrical shape to allow the FBG sensors (strain sensors) embedded therein to be evenly distributed in all directions. It should be appreciated that the struts, frames and sheath can have any other suitable shapes for various practical implementations.

As the tensegrity (inverse) kinematics is complicated by non-closed-form correlation between the manipulation task space and the tendon actuation space, the learning-based controller includes a neural network (NN) model capable of learning the analytical kinematics of the tensegrity joint by training with a large amount of high-quality training (or sampled) data.

Figure 3:
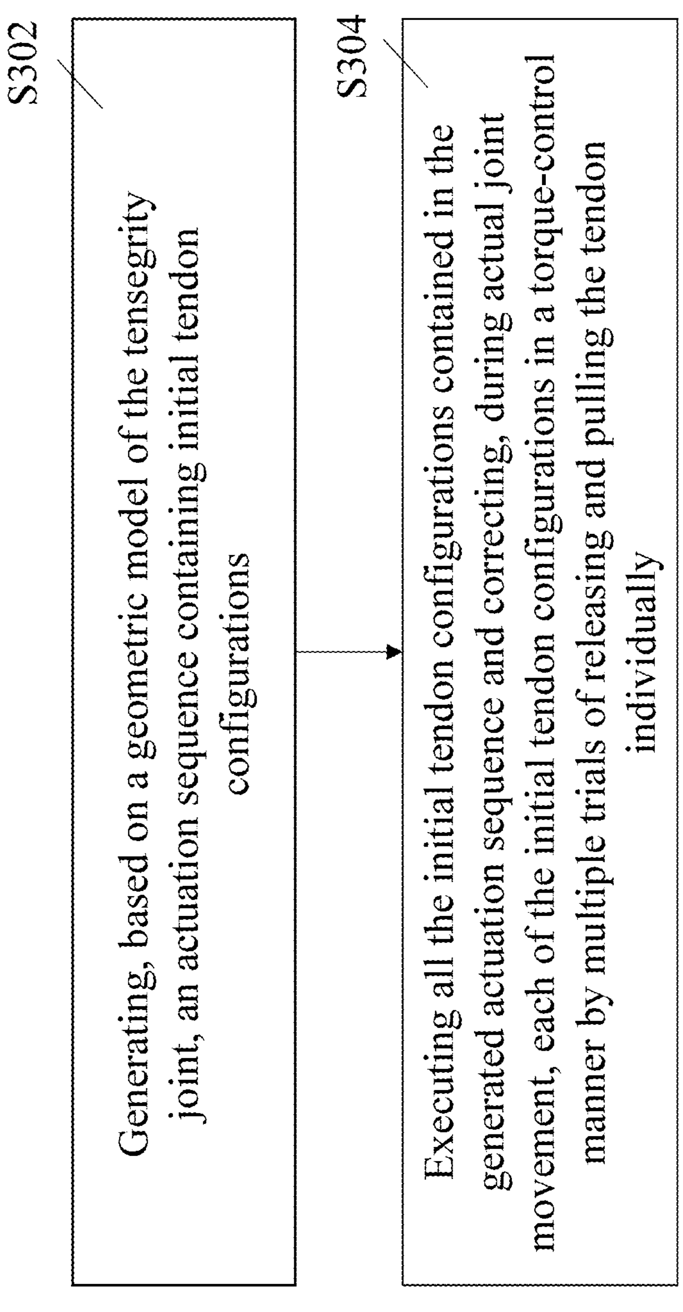
FIG. 3 shows a process flow of a sampling technique based on a basic geometric model of the tensegrity joint in accordance with one embodiment of the present invention.

In some embodiments, the sampled data may be obtained by a two-step sampling technique based on a basic geometric model of the tensegrity joint. As shown in FIG. 3, the sampling technique includes the following steps:

S302: generating, based on a basic geometric model of the tensegrity joint, an actuation sequence containing initial tendon configurations; and S304: executing all the initial tendon configurations contained in the generated actuation sequence and correcting, during actual joint movement, each of the initial tendon configurations in a torque-control manner by multiple trials of releasing and pulling the tendon individually.

Figure 4B:
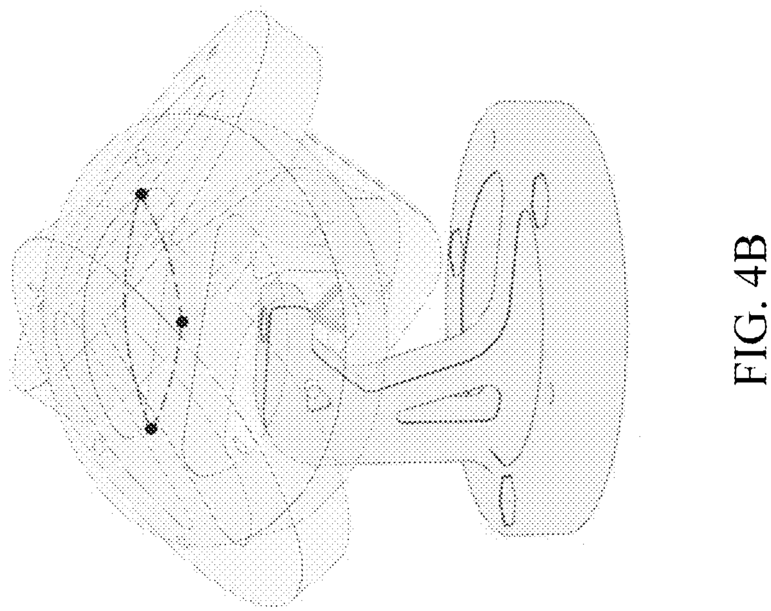
FIG. 4B shows typical rotary/universal joint configurations.
Figure 4A:
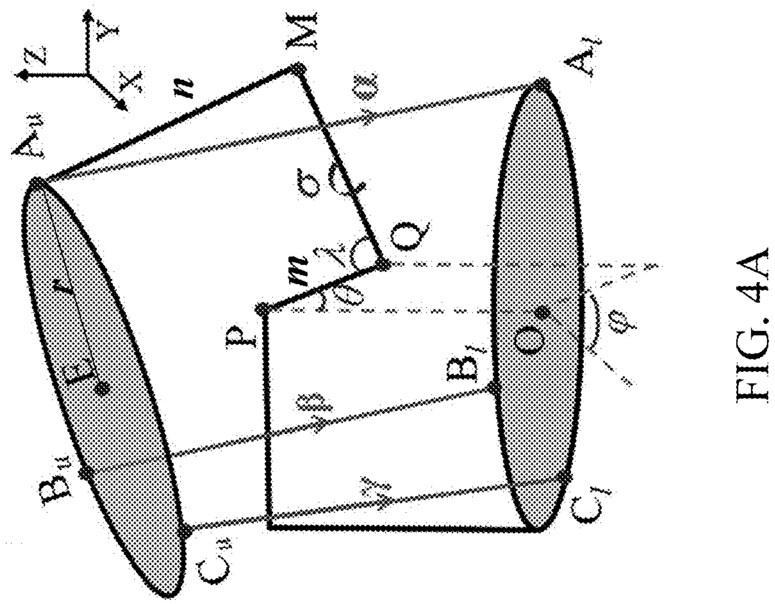
FIG. 4A shows key geometric parameters defined to deduce the joint kinematics of the tensegrity joint.

FIG. 4A shows key geometric parameters defined to deduce the basic geometric model of the tensegrity joint. As shown in FIG. 4A, the central tendon ($\overrightarrow{PQ}$) involves motions denoted by polar angle θ and azimuth angle φ, both are rotated about the apex of the lower frame (point P), making the point Q lies in a spherical surface $S_Q:=\{(Q_x, Q_y, Q_z) \| \overrightarrow{PQ}|=m\}$, where m is the central tendon length.

Simultaneously, the joint upper frame could rotate about Q and around its horizontal arm ($\overrightarrow{QM}$), respectively, by angles λ and σ. Thus, the distal end of the joint, regarded as point E, lies in a set $S_E$:

$$S_E := \left\{(E_x, E_y, E_z) \middle| |\overrightarrow{EQ}| = n, \overrightarrow{EQ} \cdot \overrightarrow{QM} = 0, M \in S_M, Q \in S_Q\right\} \tag{1}$$

where $S_M:=\{(M_x, M_y, M_z) \| \overrightarrow{QM}|=r, Q \in S_Q\}$ is a set of circles with center points following the movements of point Q, $n=|\overrightarrow{A_uM}|$ and $r=|\overrightarrow{EA^u}|$, respectively, are the height and the radius of the upper frame.

Note that the tensegrity structure is fully-constrained by the actuation tendons, the actual task space $S_T$ is a subset of $S_E$ that satisfies the boundary conditions decided by static equilibriums. The angles, λ and σ, are both dependent on the angles, θ and φ. This task space $S_T$ formed from the complex swinging motions of the upper frame about the apex, P, of the lower frame, which is not a spherical surface, unlike the typical rotary/universal joints (FIG. 4B).

With the presence of the aforementioned geometry constraints, analysis of the statics equilibriums usually involves singular matrices, making it very difficult to formulate a closed-form of the mapping between the task space $S_T$ and the corresponding tendon configurations ($q=[|\alpha|, |\beta|, |\gamma|]^T$).

Though numerical constrained optimization methods, such as the force density method and dynamic relaxation, have been proposed to deduce this mapping, determining the initial configurations for effective optimization is still an open problem.

The basic geometric model is deduced based on two assumptions: 1) there is no axial rotation of the central tendon in the absence of external disturbance; 2) the central tendon is always perpendicular to the upper frame so that angles λ and σ are set and not changed, as it is designed to be short for less overlap between the two frames. Thus, $\overrightarrow{QM}$ is always perpendicular to $\overrightarrow{PQ}$ and parallel to the plane containing points P, $A_l$, and O. Actuation tendon vectors α, β and γ can be expressed as follows:

$$\alpha = \frac{n-m}{m}\overrightarrow{PQ} - \overrightarrow{QM} - \overrightarrow{OP} - \overrightarrow{A_lO} \tag{2}$$

$$\beta = \frac{n-m}{m}\overrightarrow{PQ} - \overrightarrow{EB_u} - \overrightarrow{OP} - \overrightarrow{B_lO} \tag{3}$$

$$\gamma = \frac{n-m}{m}\overrightarrow{PQ} - \overrightarrow{EC_u} - \overrightarrow{OP} - \overrightarrow{C_lO} \tag{4}$$

Given the angles θ and φ, the actuation tendon lengths and vectors can be solved by:

$$\begin{cases} \alpha_x = (n-m)\sin\theta\cos\varphi \\ \alpha_y = (n-m)\sin\theta\sin\varphi - \dfrac{r\cos\theta}{\psi} + r \\ \alpha_z = (m-n)\cos\theta - \dfrac{r\sin\theta\sin\varphi}{\psi} - n \end{cases} \tag{5}$$

$$\begin{cases} \beta_x = (n-m)\sin\theta\cos\varphi + \dfrac{\sqrt{3}\,r(\psi-1)}{2} \\ \beta_y = (n-m)\sin\theta\sin\varphi - \dfrac{r\left(\sqrt{3}\sin^2\theta\sin\varphi\cos\varphi - \cos\theta\right)}{2\psi} - \dfrac{r}{2} \\ \beta_z = (m-n)\cos\theta + \dfrac{r\sin\theta\left(\sin\varphi + \sqrt{3}\cos\varphi\cos\theta\right)}{2\psi} - n \end{cases} \tag{6}$$

$$\begin{cases} \gamma_x = (n-m)\sin\theta\cos\varphi - \dfrac{\sqrt{3}\,r(\psi-1)}{2} \\ \gamma_y = (n-m)\sin\theta\sin\varphi + \dfrac{r\left(\sqrt{3}\sin^2\theta\sin\varphi\cos\varphi + \cos\theta\right)}{2\psi} - \dfrac{r}{2} \\ \gamma_z = (n-m)\cos\theta + \dfrac{r\sin\theta\left(\sin\varphi - \sqrt{3}\cos\varphi\cos\theta\right)}{2\psi} - n \end{cases} \tag{7}$$

where $$\psi = \left(\cos^2\theta + \sin^2\theta\sin^2\varphi\right)^{\frac{1}{2}}.$$

In the step of S302, based on the basic geometric model of the tensegrity joint, initial tendon length combinations, acting as the expected sampling of the joint configurations, are generated. Such preliminarily generated configuration does not guarantee that the joint is in static equilibrium and may induce tendon slacking, which would cause the joint to collapse. More specifically, an actuation sequence containing initial tendon configurations is generated by the basic geometric (BG) model, such that $q_k=[|\alpha_k|, |\beta_k|, |\gamma_k|]^T=BG(\theta_k, \varphi_k)$, where $k \in \{1, 2, \ldots, N\}$ is the sample index, N is the total number of samples (i.e. initial tendon configurations) and the input angles variation as $\theta_k \in [0,25°]$ and $\varphi_k \in [0,360°]$.

Figure 5:
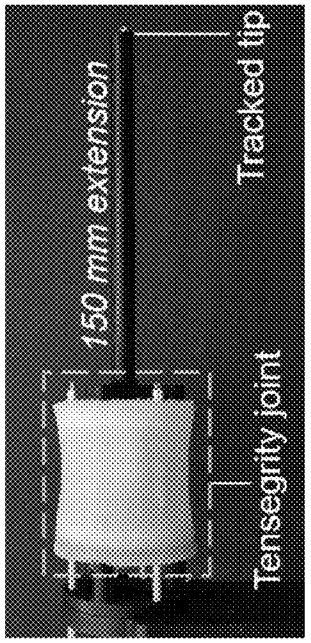
FIG. 5 shows an experimental setup for evaluating the workspace of the distal tip and the control performance of the tensegrity joint.

For performing step S304, a tensegrity joint is fabricated as shown in FIG. 5. The main body of the fabricated tensegrity joint is 61-mm long, with an outer diameter of 56 mm and a weight of about 60 g, comprising two 3D-printed circular frames made of high Young's modulus and lightweight ultraviolet (UV)-curable resin. The tendons were made of braided streel and with an outer diameter of 1.2 mm. The elastic protection sheath was made of pre-stretched silicone (Ecoflex30, Smooth-On Inc., USA) sheath, having a weight of 35 g and wrapped on the cylindrical surface between the upper and lower frames.

The joint was clamped horizontally so as to afford the most gravity load or external force disturbance to be applied on the links or end-effector. The distal tip (end-effector) was positioned by 150 mm (~250% self-height) from the upper frame along a rigid rod.

Its pose could be tracked by an electromagnetic (EM) tracking system (NDI Medical Aurora) as the ground truth. With this 150-mm arm length, the joint manipulation and control performance can be analyzed in a proper spatial resolution, illustrating any error observed readily within the workspace. Attributing to the tendon-driven mechanism that enables remote transmission, all the motors could be based and fixed on the ground. It is worth noting that the EM tracking was only used in the calibration and training of the learning-based controller, and also as the ground truth or baseline for performance analysis.

In the step of S304, all initial tendon configurations $q_k$ contained in the actuation sequence are executed by the actuation motors. In each actual joint movement, the tendon combination is corrected in a one-go calibration manner by multiple trials of releasing ($\hat{q}$) and pulling ($\tilde{q}$) the tendon individually. All the three tendons are tightened without slacking based on the motor torque control feedback. A light torque threshold (0.15 N·m) is pre-set, so not to overtighten the tendons too much. As such, the structure of the joint is ensured in static equilibrium till all the three tendons tightened properly below the maximum motor torque threshold pre-set. Then the task space sample, namely the tracked tip position, and its actual configuration sample, which is the tendon length, are both recorded as a training dataset.

Once N datasets are collected, a neural network (NN) model (e.g., with one hidden layer of 100 neurons) is implemented to train the controllers. The activation of tanh was exploited in the data training. The used L2 loss could be denoted by:

$$\text{Loss} = \frac{1}{N}\sum_{i=1}^{N}\left\| q_i^G - q_i^P \right\|^2 \tag{8}$$

where $$q_i^G \text{ and } q_i^P$$

are the ground truth and the prediction of tendon configuration, respectively.

In one embodiment, the controller is trained to operate as an open-loop controller. For the training of open-loop controller, N=2,237 pairs of 2D tracked tip positions (z) and the corresponding tendon configurations (q) were regarded as input and output, respectively.

In one embodiment, the controller is trained to operate as a close-loop controller. For the training of closed-loop controller, position pairs in which the tip separations were less than a pre-set step size, were searched randomly at first, forming a dataset (10,000 samples) of paired joint configurations are collected such that the tip separation of the position pair has to be less than a pre-set step size in various directions.

Then these relative positional changes (Δz), together with their target positions (z*), are taken as input. And the relative changes in tendon lengths (Δq) for each motion are taken as output. This forms the input training dataset of joint motions in multiple directions. The corresponding actuation changes act as the output training dataset. Thus, the trained model could correct deviations of the joint motion by using the sensing feedback provided by the FBG-based shape sensing unit.

For implementation of FBG-based shape sensing, an optical fiber with a single core of 18 FBGs (FBGS International) is helically wrapped inside the shallow groove on the soft sheath and sealed using silicone adhesive (Sil-Poxy, Smooth-On Inc.). It functions as a high-level sensor capable of sensing the joint configurations in real time (sampling rate ≥100 Hz) for closed-loop feedback control.

Figure 6B:
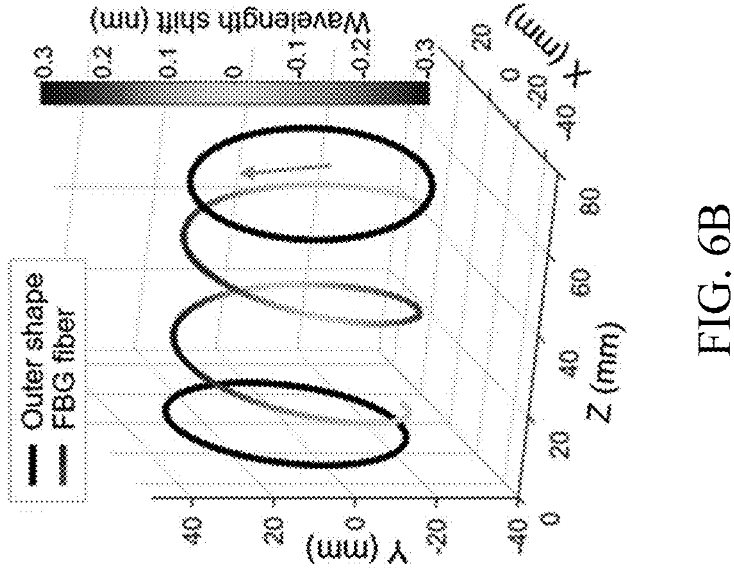
FIG. 6B shows a plot of FBG wavelength shifts overlaid along the helical layout of the optical fiber embedded inside the joint's sheath.
Figure 6A:
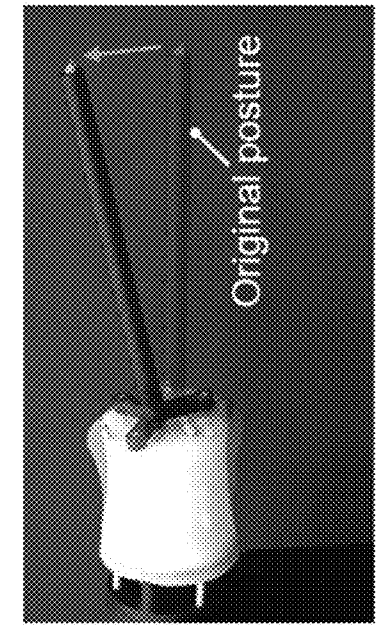
FIG. 6A shows a path following test on the tensegrity joint with learning-based control and fiber Bragg grating (FBG)-based shape sensing feedback.

Light wavelength shifted by FBG-based shape sensing unit is proportional to the change of strain applied on the FBG. Together with all the sparse FBG-strain change data collected via the single-core optical fiber, enough cues for estimating the joint configuration in pan/tilt DoFs (FIG. 6A) may be obtained, accredited to the unique mapping from the combination of detected FBG-strains to the tip positions, for which we also adopted a data-driven approach. More specifically, real time FBG-strains are collected as the input training dataset, while the EM-tracked tip positions are captured as the output training dataset during a calibration movement of the joint.

More specifically, the joint (i.e. controller) was commanded to move the end-effector (i.e. the tracked tip) along a spiral path within the workspace (FIG. 6B), and samples were collected each time after the tracked tip moved with a pre-set distance. After a training dataset (1,275 samples) were collected, another NN model (e.g., a NN model with one hidden layer of 100 neurons) is utilized to train the learning-based controller to operate as a close-loop controller by incorporating input as real-time FBGs strain data, and output as the corresponding joint configuration.

Actuation Efficiency

Figure 7:
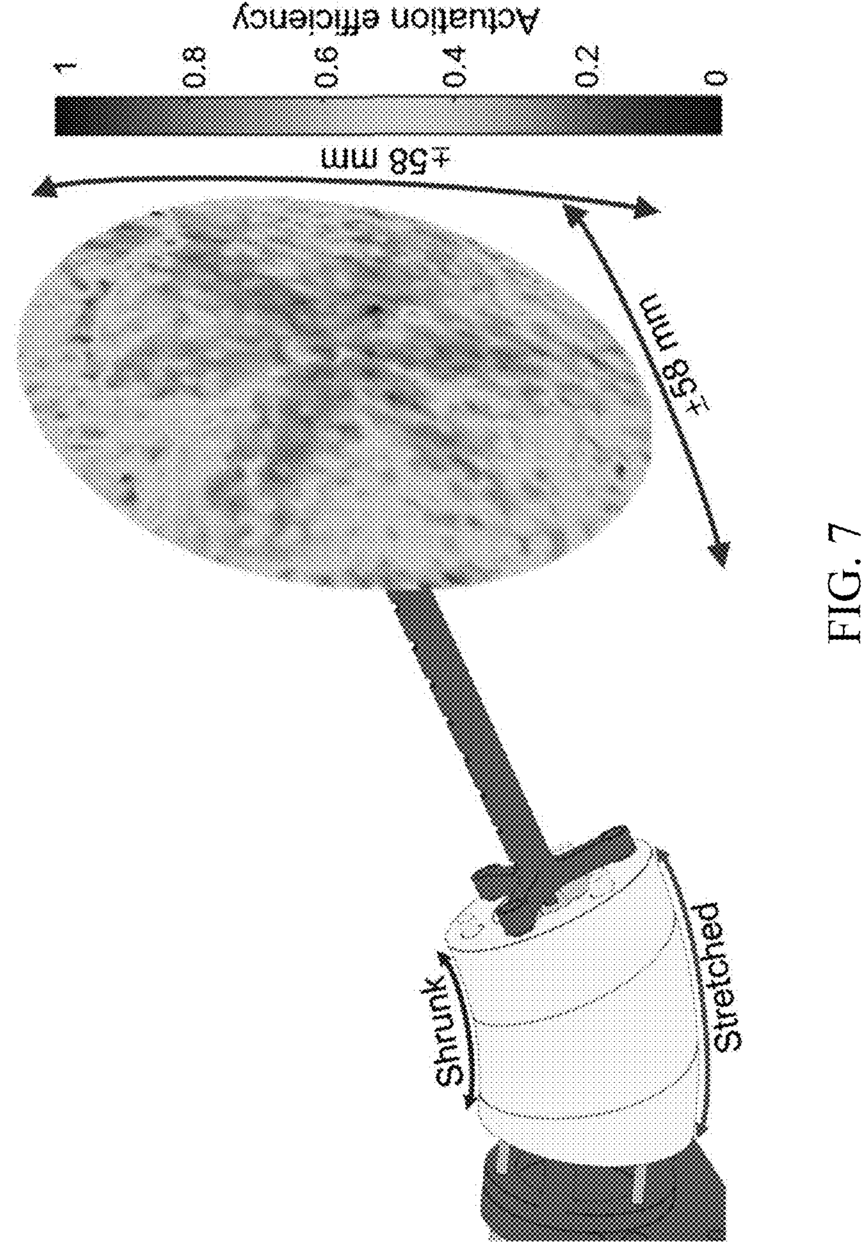
FIG. 7 shows a 3D workspace of the distal tip measured by an EM tracker. Higher actuation efficiency (cooler color) indicates less actuation changes necessary for the same amount of tip displacement.

FIG. 7 shows the workspace collected by the two-step sampled distal tip positions. Along the workspace, actuation efficiency is quantified at each sampled tip position, indicating the total amount of tendon length changes required to move the tip to its adjacent position by a unit of length. The less the total change of tendon lengths, the higher the quantified efficiency, which is used to evaluate the variation in actuation demand across the workspace. At each sampled position, four adjacent positions were randomly selected for the calculation of actuation efficiency, and such efficiency has been normalized between 0 and 1.

The workspace is projected on 2-D circle with the diameter of 116 mm, corresponding to a bending angle of ±25°. The pattern of the resultant actuation efficiency appears hexagonally symmetric. When the tip moves along the directions where the tendons were located, the joint pan angle aligns with that of all the tendons. This allows for the most efficient adjustment of the joint tilt angle, resulting in the formation of a hexagon pattern due to the three tendons. Moreover, the actuation becomes less efficient when the tip moves close to the circular edge of the workspace, indicating the need for dramatic changes in tendon lengths at large bending angles.

The range of available bending angles could be varied by adjusting the joint dimensions. Reducing the joint radius could increase the overall actuation efficiency thus allowing larger bending angles. However, this would decrease the joint payload capacity due to the reduced moment arm, which in return requires a larger force output from the actuation system.

Dynamic response of the tendon motors used is also the key to defining the proper range of bending angles, such that the tendon slacking can always be compensated sufficiently fast. This explains the angle ±25° based on the choice of tendon motor (Dynamixel, MX-64AT).

Figure 8:
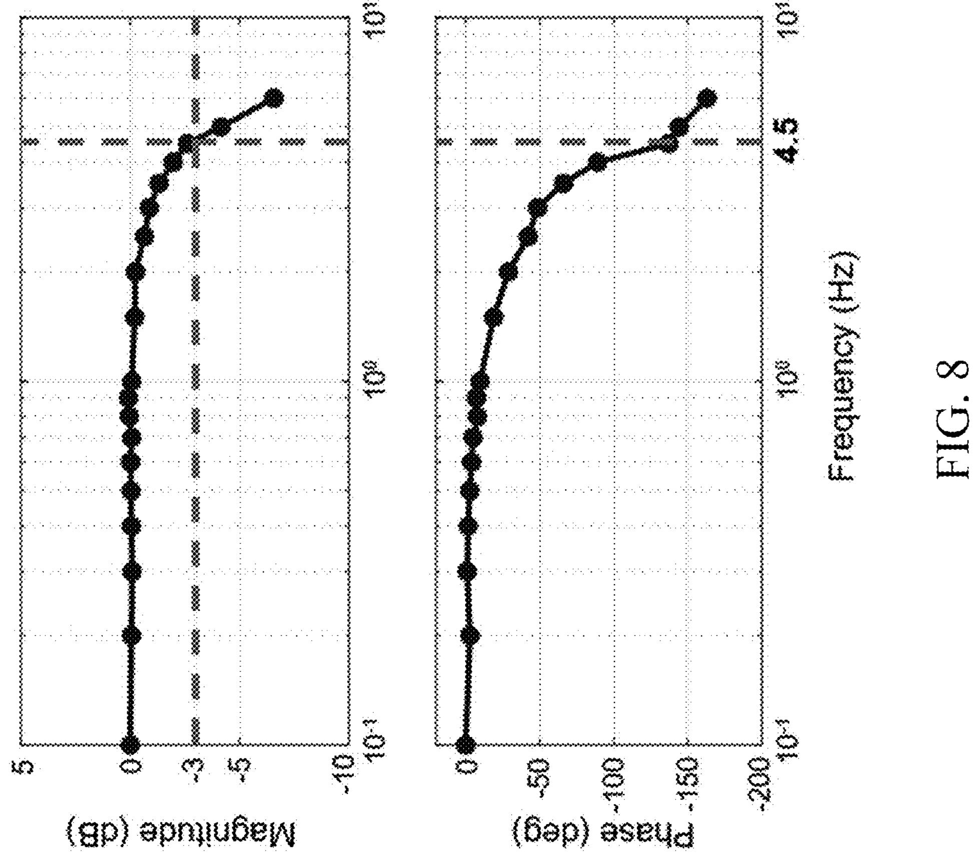
FIG. 8 shows frequency response of the tensegrity joint with cutoff frequency measured at 4.5 Hz.

Furthermore, an experimental frequency response study was conducted to obtain the optimal control bandwidth. Two motors were commended to pull and release their tendons simultaneously. This pull-and-release is a harmonic motion repeated periodically at the input frequency ranged from 0.1 Hz to 6 Hz. The distal tip motion tracked by the EM tracker becomes the output. FIG. 8 is the resultant bode plot, showing the tip motion magnitude decayed by 3 dB, when the pull-and-release was repeated at 4.5 Hz. For the sake of fair performance analysis of the joint, in the latter experiments, the joint control commands or the joint motion changes are kept below such an optimal bandwidth (4.5 Hz).

Path following test was carried out to evaluate the joint manipulation accuracy. Open-loop control was first applied, which solely employed the sampled actuation space to operate the joint (at <4.5 Hz) without any shape sensing feedback to the controller. The distal tip was controlled to follow an "8"-like path within 80×40 mm, as shown in FIG. 9A. The tip motion was EM-tracked and projected on a 2D plane for readily illustrating the path deviation in a unit of Euclidean distance.

Figure 9B:
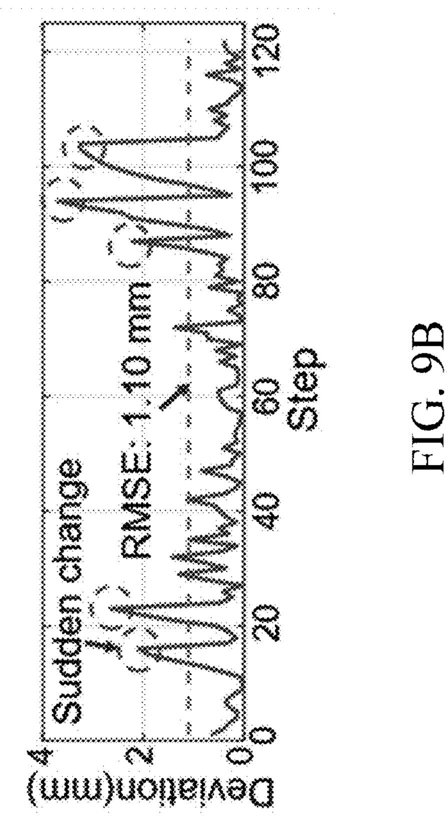
FIG. 9B shows corresponding tracking deviation calculated as Euclidean distance bounded below 4 mm throughout the cycle of 121 time steps (~30 s).
Figure 9A:
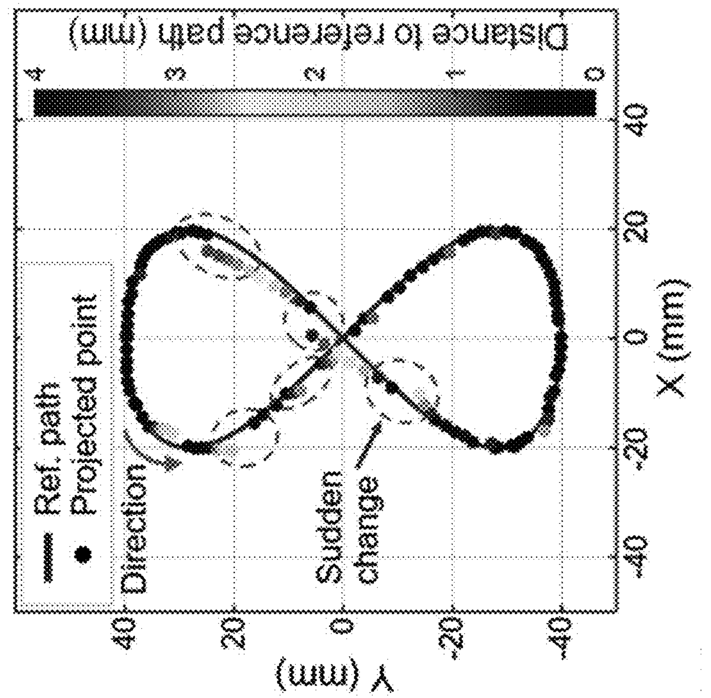
FIG. 9A shows a 2D-projected reference and actual paths captures in an "8"-like path following performance test on the tensegrity joint under open-loop control.

Root-mean-square error (RMSE) was used to indicate overall accuracy of the path following task (FIG. 9B). Even under the open-loop control, this path following RMSE was measured as 1.10 mm only. This indicates the two-step sampling method, as well as the trained NN-based controller, can fully constrain the actuation space, ensuring zero tendon slacking throughout the path following task.

Figure 10A:
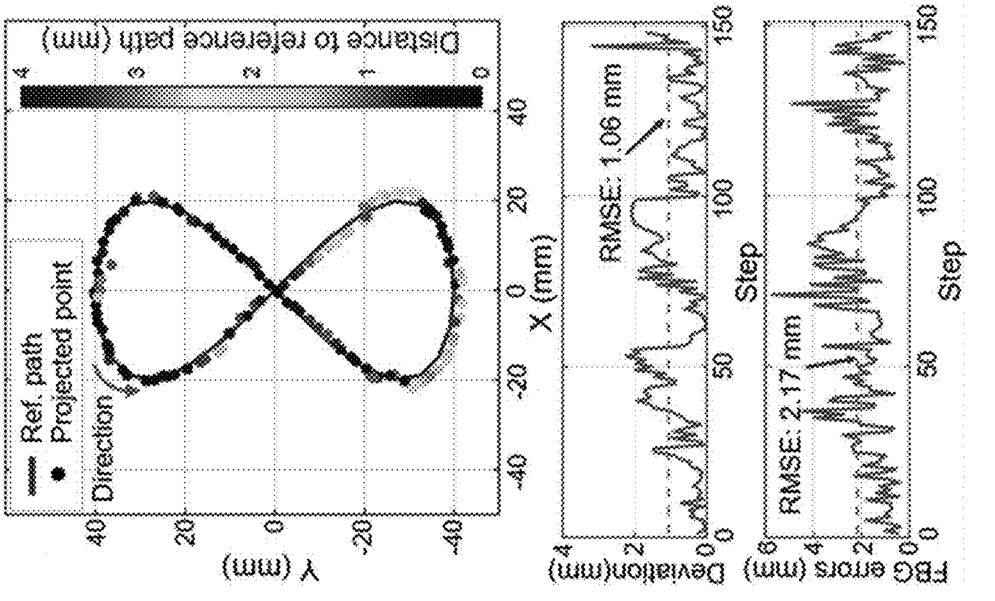
FIGS. 10A and 10B show the tracking deviation under closed-loop control with the FBGs in path following tasks for an "8"-like path, and square path respectively.
Figure 10B:
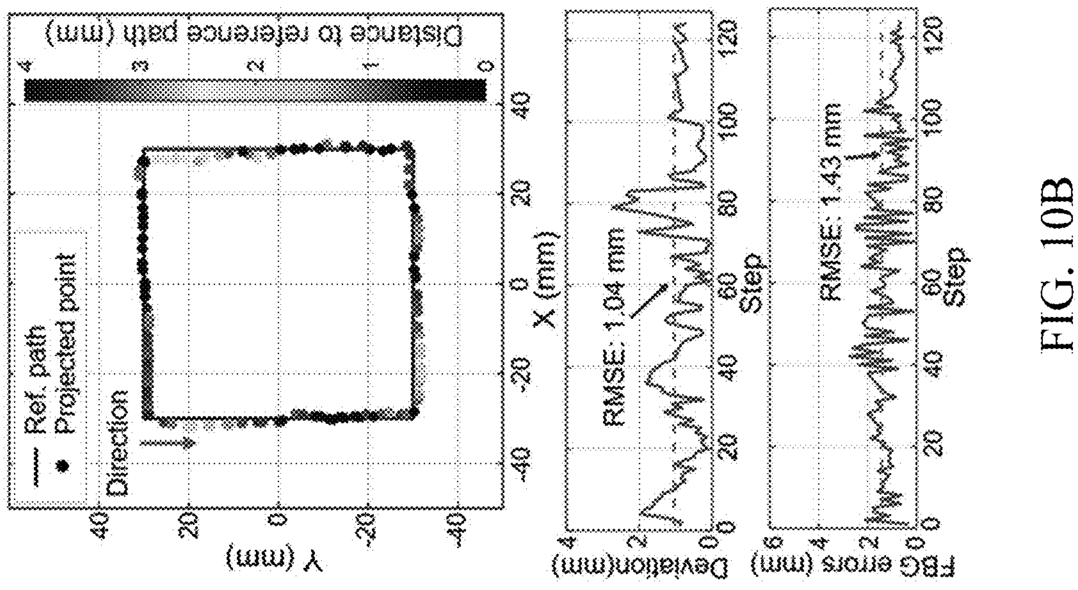

The path following tests with the same "8"-like pattern (FIG. 10A) as in the open-loop control task, as well as the square path (FIG. 10B), were carried out to evaluate the closed-loop control accuracy with FBG sensing feedback. The tip motion was EM-tracked and projected on 2D, and the sensing errors were calculated by the Euclidean distance between the EM-tracked and FBG-predicted tip positions.

Although compared to the open-loop control (RMSE of 1.10 mm), the RMSE under closed-loop control (1.06 mm) was only slightly lower, the sudden deviation (e.g., marked in FIG. 9A) reduced significantly. Only 6.8% and 5.6% of the deviations are above 2 mm in the "8"-like and square paths, respectively, showing closed-loop motions is smoother, relative to 11.5% deviations that is above 2-mm under the open-loop control.

Moreover, the peak deviation is reduced by 13.9% in the "8" path. For the FBG sensing errors, the 2.17-mm RMSE (FIG. 10A) corresponds to an angular error <1°. The positional deviations sensed by FBG were fed into the controller, enabling real-time correction, and compensating for the incoordination of the motor actuations observed in the open-loop control.

Joint Manipulation Accuracy

Figure 11B:
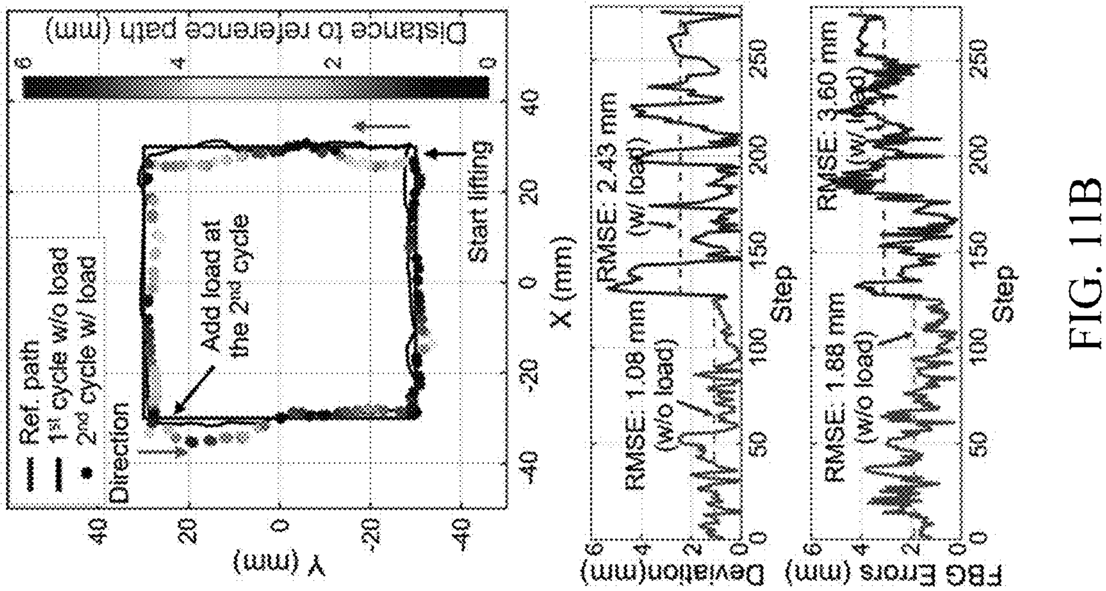
FIGS. 11A and 11B show two cases of path following with a load of 114 g (about twice the self-weight) and no tendon preload respectively.
Figure 11A:
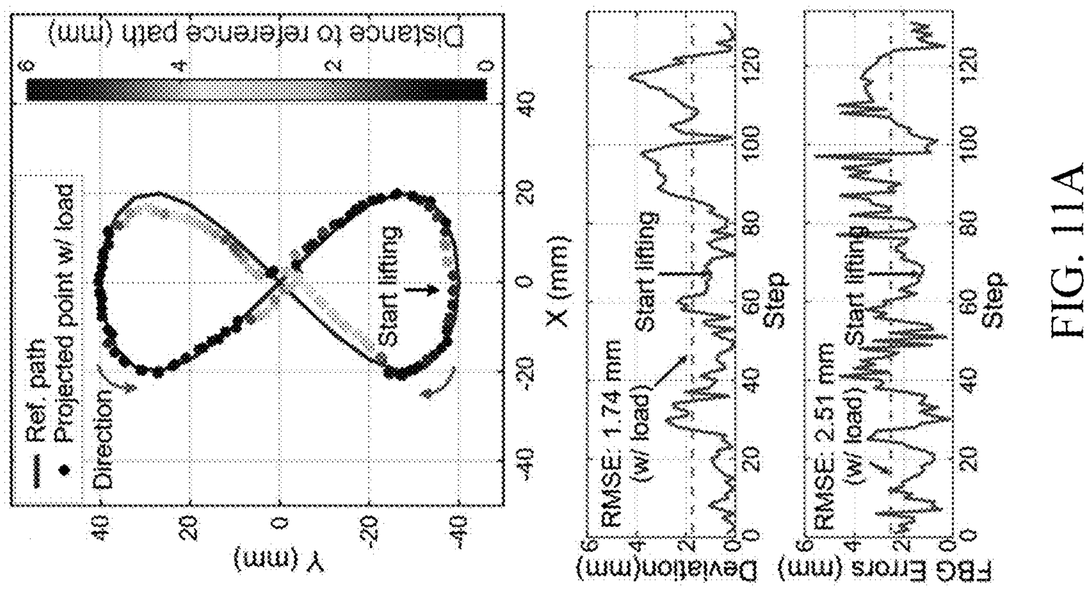

To evaluate joint manipulation accuracy under loading, path-following task under high load was performed. The same paths as in FIGS. 10A and 10B were used but an additional 114-g load was placed on the joint link which was 35-mm far from the joint upper frame. It is worth noting that no re-training or re-calibration was conducted for the learning-based controller, that is, only the samples without external load were involved in the training data. Two cases were tested to evaluate the manipulation robustness, one with the load being applied from the beginning and consistently throughout the path following (FIG. 11A), and the other with the load being applied intermediately (FIG. 11B). In the first case, consistent load was applied throughout path following of the "8"-like path. In the second case, the robot ran without external load in the 1$^{st}$ cycle while the load was applied at the beginning of the 2$^{nd}$ cycle without pauses.

In the case with the load being applied from the beginning, the tensegrity joint maintained low tracking deviations with an RMSE of 1.74 mm. The robot followed the target path closely when moving downwards, while larger deviations were observed during the lifting motion (marked by warmer color in FIG. 11A). This may be mainly caused by the FBG-based sensing error when encountering untrained deformations of joint sheath. Such error occurs when large tension incremented to support a stronger load.

In the case with the load being applied intermediately, the prediction or sensing errors were further increased. In this case, deviations were significantly increased in the first few seconds when the impulsive disturbance (i.e., adding the load) was applied. Although the joint could approach toward the target path again, the deviations were still 39.7% larger than those in the case with the load from the beginning.

As the robot was horizontally clamped, all the tendons took the most effort from the load gravity, causing the joint upper frame shifted from its original configuration. This stretches the sheath further on one side, causing the strain change distribution along the FBG fiber slightly different from that in the unloaded configurations during the data training, sequentially degrading the position predictions used as the control feedback. In the case with the load from the beginning, the load-induced stretching was already involved when the robot started moving. However, when the load was added intermediately, this additional stretching change resulted in an uneven distribution of overall strain changes.

Therefore, tightening the tendons with stronger preloading can increase the structural stiffness, hence reducing the uneven sheath stretching along its cylindrical surface, eventually, would reduce the sensing error. On the other hand, reducing the preload would result in higher compliance, but also makes the joint softer.

Figure 12A:
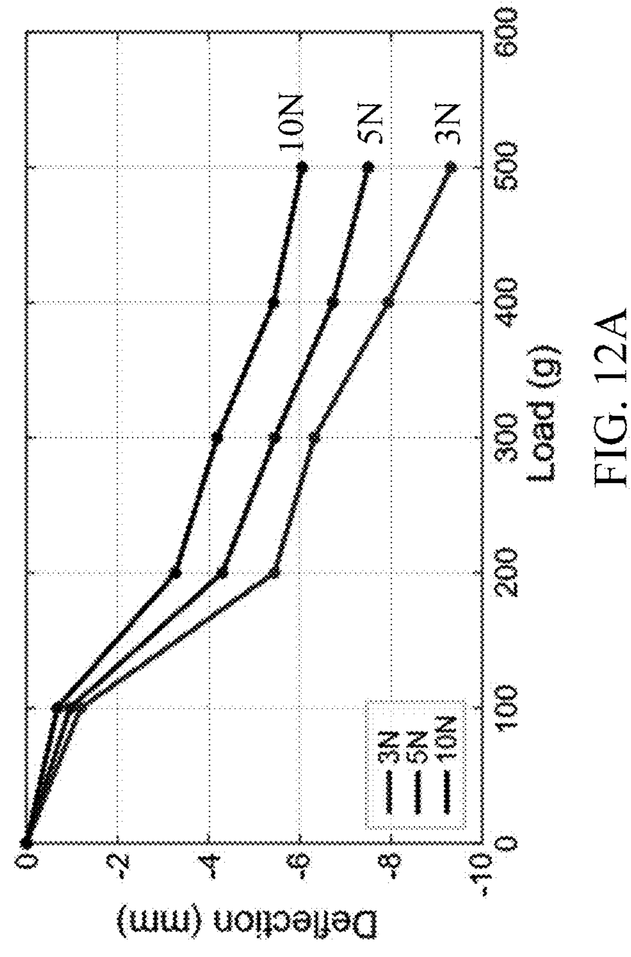
FIGS. 12A and 12B show joint stiffness of the tensegrity joint applied under three levels of tendon preload, 3 N, 5 N, and 10 N, evaluated in two tests respectively with static load and impulsive disturbance.
Figure 12B:
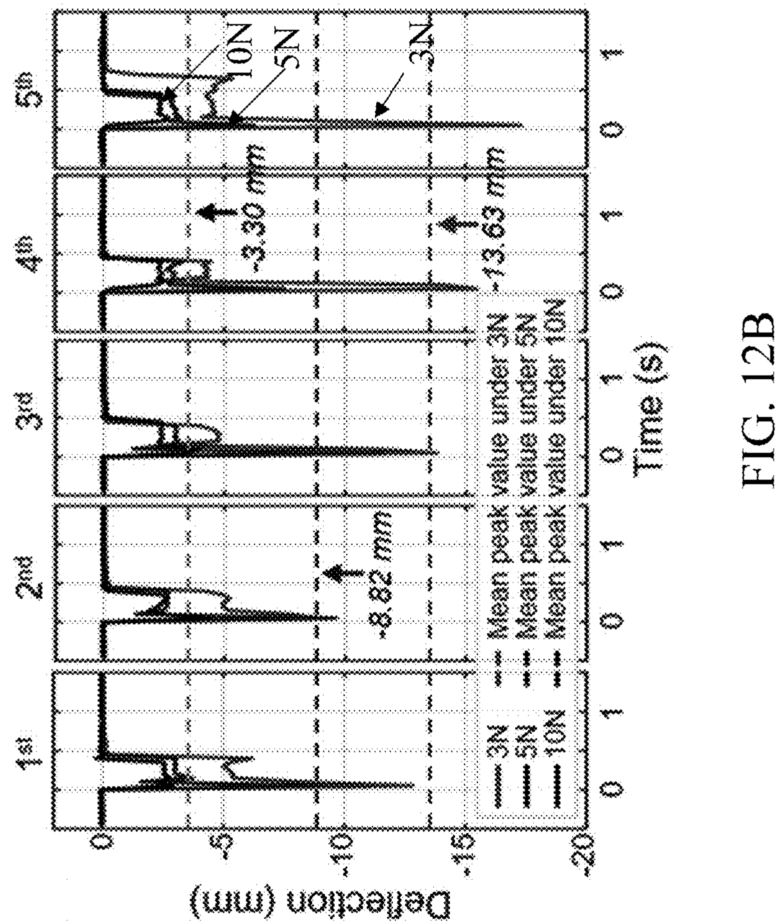

The joint stiffness under three levels of tendon preload, 3 N, 5 N, and 10 N, were evaluated in two tests respectively with static load and impulsive disturbance. FIG. 12A shows tip deflection measurement in the test with static load. FIG. 12B shows tip deflection measurement in the test with impulsive disturbance, where a 114-g weight was dropped from 1 cm above onto the joint link. This impulsive disturbance test was repeated 5 times for each preloading level. In the load-deflection test, static loads ranging from 100 g to 500 g were sequentially applied 10-mm aside from the joint upper frame.

The test was repeated three times for each preloading level and load condition, during which the tip deflection under each load was measured by the EM tracker, and shown in FIG. 12A. In the test with 500-g load, the tip deflection was reduced by 19.5% and 35.1%, respectively, under 5-N and 10-N preloading, compared to the deflection of 9.32 mm under 3-N preloading. Similar results were also found in the impulsive disturbance test (FIG. 12B), where the force disturbances were applied by dropping a 114-g weight from 1-cm above the link which is 35-mm far from the joint upper frame, and the test was repeated five times for each preloading level.

Relative to the average peak deflection of 13.63 mm when 3-N preload applied, there was deflection reduced by 35.3% and 75.8%, respectively, under 5-N and 10-N preloading. The less deflection indicates the increased joint stiffness, according well with our hypothesis, such that the structural tensegrity stiffness is controllable by varying the tendon preloads.

It is also worth noting that for impulsive disturbance, the joint under all these preloading levels could restore its natural configure in the similar amount of time, 0.5 s, indicating the robust response or resistance to external disturbances. It can be explained by the fully-constrained property of our presented tensegrity.

In addition to the preloading, the two joint frames were wrapped by a pre-stretched elastic (silicone) sheath. This also possesses inherent compliance to any force interaction on the joint body and link.

Figure 13A:
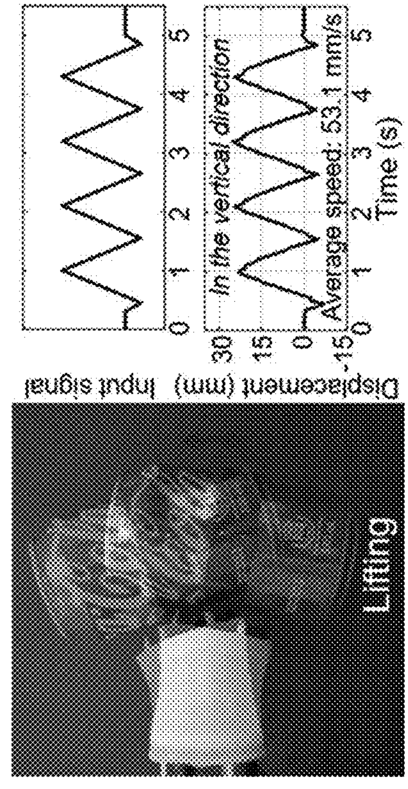
FIGS. 13A and 13B shows experimental setups for evaluating dynamic performance of the tensegrity joint through manipulation of a coke can and corresponding results for lifting and shaking the coke can with rapid change of motion directions, respectively.
Figure 13B:
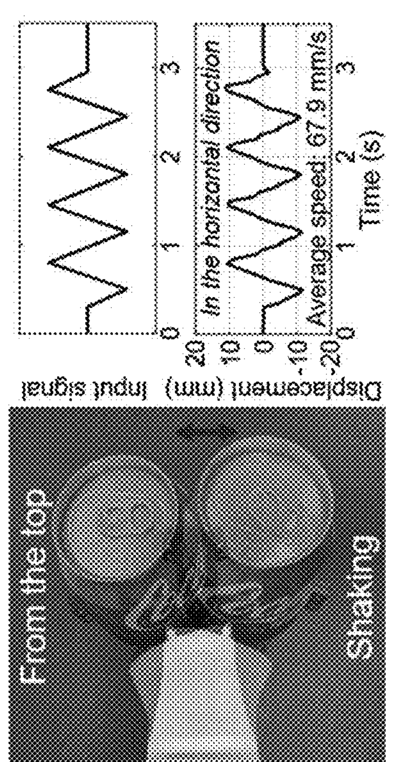

To further explore the dynamic performance, a 360-g can of cola was held 45-mm aside from the joint upper frame, and being lifted (up and down, FIG. 13A) at an average speed of 53.1 mm/s (angular speed of 0.95 rad/s) and shaken (left and right, FIG. 13B) at an average speed of 67.9 mm/s (angular speed of 1.19 rad/s), respectively, also with rapid change of motion directions. Note that the can weighs six times the tensegrity joint itself. The motion outcome was smooth, accredited to no static or sliding contact friction between the two joint frames.

The fully-constrained property and low-inertia of the joint enable a maximum angular acceleration of over 10 rad/s$^2$, giving rise to agile and flexible manipulation without overshoot. With the controllable stiffness and compliance of the joint, the tensegrity joint has great potential to perform various tasks of interactions with human body.

Figure 14B:
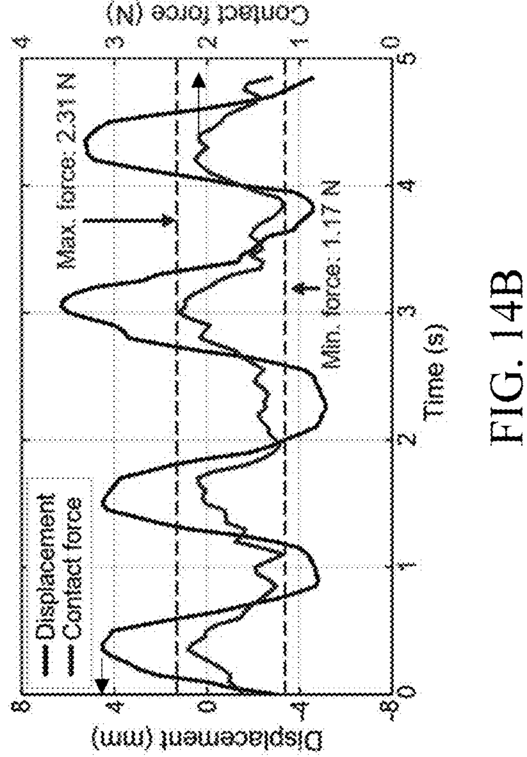
FIG. 14B shows the passive motion of the ultrasound probe that complied with breathing, and contact force between the ultrasound probe and abdomen skin when low joint stiffness was applied.
Figure 14A:
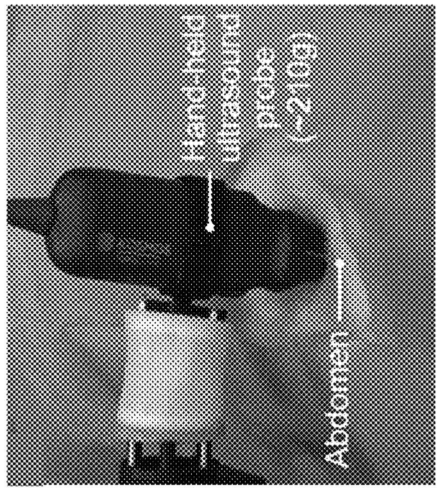
FIG. 14A shows tensegrity joint maneuvering a portable ultrasound probe for abdominal imaging.

In one exemplary application, the tensegrity joint was used to maneuver a ~210-g ultrasonic portable probe (FIG. 14A) for abdominal ultrasound imaging. The probe is about 3.5 times the joint self-weight. It was demonstrated that the low joint stiffness applied could allow the probe to comply with any physiological motion mostly due to breathing. During the up-and-down probe displacement of about ±5 mm, the contact force between the probe and the abdomen skin was kept within the range of 1.17 N to 2.31 N (FIG. 14B), thus maintaining the imaging quality. By adjusting the tensions, it could be controlled stiffer to conform the imaging on a region of interest. This joint dynamic property would add much confidence to tele-manipulation of various ultrasound examinations.

The functional units and modules of the learning-based tensegrity robot joint in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

While the present disclosure has been described and illustrated with reference to specific embodiments thereof, these descriptions and illustrations are not limiting. The illustrations may not necessarily be drawn to scale. There may be distinctions between the renditions in the present disclosure and the actual apparatus due to manufacturing processes and tolerances. There may be other embodiments of the present disclosure which are not specifically illustrated. Modifications may be made to adapt a particular situation, material, composition of matter, method, or process to the objective and scope of the present disclosure. All such modifications are intended to be within the scope of the claims appended hereto. While the methods disclosed herein have been described with reference to particular operations performed in a particular order, it will be understood that these operations may be combined, sub-divided, or reordered to form an equivalent method without departing from the teachings of the present disclosure. Accordingly, unless specifically indicated herein, the order and grouping of the operations are not limitations.

What is claimed is:

1. A tensegrity joint comprising:

a first inner structure having a first frame and a first strut extending orthogonally from the first frame;

a second inner structure having a second frame and a second strut extending orthogonally from the second frame;

at least three actuation tendons, each being fixed at a respective hole at the first frame and being guided and allowed to slide through a respective hole at the second frame;

a central tendon connecting an apex of the first strut and an apex of the second strut such that the central tendon is in balance with the pulling forces exerted by the at least three actuation tendons;

an outer elastic protection sheath configured to wrap around a cylindrical surface between the first and second inner structures; and a fiber-Bragg-gratings sensor wounded helically around and embedded inside the outer elastic protection sheath and configured for sensing configurations of the tensegrity joint in real time for closed-loop feedback control.

2. The tensegrity joint of claim 1, wherein the outer elastic protection sheath is prestressed to pull the first and second inner structures to each other to provide resistance to torsional force and restore the tensegrity joint to an original or natural equilibrium.

3. The tensegrity joint of claim 1, wherein the first strut and the second strut are positioned relative to each other at a level to allow the tensegrity joint to bend at a bending angle.

4. The tensegrity joint of claim 1, wherein each of the actuation tendons and central tendon is made of braided metal wires.

5. The tensegrity joint of claim 1, wherein the first and second frames are circular.

6. The tensegrity joint of claim 1, wherein the first and second struts are "L"-shaped.

7. The learning-based tensegrity robot joint of claim 1, wherein the outer elastic protection sheath is made of silicone.

8. A learning-based tensegrity robot joint, comprising:

the tensegrity joint of claim 1; and a learning-based controller configured for controlling the tensegrity joint.

9. The learning-based tensegrity robot joint of claim 8, wherein the outer elastic protection sheath is prestressed to pull the first and second inner structures to each other to provide resistance to torsional force and restore the tensegrity joint to an original or natural equilibrium.

10. The learning-based tensegrity robot joint of claim 8, wherein the first strut and the second strut are positioned relative to each other at a level to allow the tensegrity joint to bend at a bending angle.

11. The learning-based tensegrity robot joint of claim 8, wherein each of the actuation tendons and central tendon is made of braided metal wires.

12. The learning-based tensegrity robot joint of claim 8, wherein the first and second frames are circular.

13. The learning-based tensegrity robot joint of claim 8, wherein the first and second struts are "L"-shaped.

14. The learning-based tensegrity robot joint of claim 8, wherein the outer elastic protection sheath is made of silicone.

15. The learning-based tensegrity robot joint of claim 8, further comprising at least three motors for pulling the at least three actuation tendons respectively.

16. The learning-based tensegrity robot joint of claim 8, wherein the learning-based controller is trained on basis of a training dataset prepared by a sampling technique including:

generating, based on a geometric model of the tensegrity joint, an actuation sequence containing initial tendon configurations; and executing all the initial tendon configurations contained in the generated actuation sequence and correcting, during actual joint movement, each of the initial tendon configurations in a torque-control manner by multiple trials of releasing and pulling the tendon individually.

17. The learning-based tensegrity robot joint of claim 16, wherein the learning-based controller is further trained on basis of sensing feedback provided by the fiber-Bragg-gratings sensor.

18. A method for training the learning-based tensegrity robot joint of claim 8, the method comprising:

training the learning-based controller of the learning-based tensegrity robot joint on basis of a first training dataset prepared by a sampling technique;

installing an end-effector on the learning-based tensegrity robot joint;

commanding the learning-based controller to move the end-effector to move along a spiral path for a plurality of pre-set distances within a workspace;

tracking a tip position of the end-effector by a tracker and detecting a strain change of the outer elastic protection sheath by the fiber-Bragg-gratings sensor after the end-effector is moved with each of the pre-set distances; and collecting the tracked tip positions and detected strain changes to form a second training dataset to train the learning-based controller to operate as a close-loop controller.

19. The method according to claim 18, wherein the geometric model is deduced by assuming:

there is no axial rotation of the central tendon in the absence of external disturbance; and the central tendon is perpendicular to the first frame.

20. The method according to claim 16, wherein the sampling technique includes:

generating, based on a geometric model of the tensegrity joint, an actuation sequence containing initial tendon configurations; and executing all the initial tendon configurations contained in the generated actuation sequence and correcting, during actual joint movement, each of the initial tendon configurations in a torque-control manner by multiple trials of releasing and pulling the tendon individually.

* * * * *